United States Patent

Watkins et al.

[11] 4,127,173
[45] Nov. 28, 1978

[54] METHOD OF GRAVEL PACKING A WELL

[75] Inventors: Larry A. Watkins, Abqaiq, Saudi Arabia; John W. Graham, Alvin, Tex.

[73] Assignee: Exxon Production Research Company, Houston, Tex.

[21] Appl. No.: 819,800

[22] Filed: Jul. 28, 1977

[51] Int. Cl.² ............................................. E21B 43/04
[52] U.S. Cl. .................................. 166/276; 166/278; 166/287
[58] Field of Search ............... 166/276, 295, 290, 287, 166/285, 278

[56] References Cited

U.S. PATENT DOCUMENTS

| | | | |
|---|---|---|---|
| 2,080,406 | 5/1937 | Allen | 166/288 X |
| 2,609,052 | 9/1952 | Kantzer | 166/287 |
| 3,070,160 | 12/1962 | Reistle, Jr. | 166/276 X |
| 3,182,722 | 5/1965 | Reed | 166/276 X |
| 3,548,942 | 12/1970 | Terry | 166/276 |
| 3,696,867 | 10/1972 | Waid | 166/276 |
| 3,760,880 | 9/1973 | Dollarhide | 166/276 |
| 3,854,533 | 12/1974 | Gurley et al. | 166/276 |
| 3,857,444 | 12/1974 | Copeland | 166/276 |
| 3,929,191 | 12/1975 | Graham et al. | 166/276 |

Primary Examiner—Stephen J. Novosad
Attorney, Agent, or Firm—Michael A. Nametz; Gary D. Lawson

[57] ABSTRACT

A method of forming a gravel pack in a wellbore is disclosed which involves disposing a pipe adjacent the incompetent formation, depositing gravel around the pipe, consolidating the resulting gravel bed using a suitable resinous material, and removing the pipe to leave a high permeability, high strength, self-supporting annular gravel sheath.

15 Claims, 2 Drawing Figures

METHOD OF GRAVEL PACKING A WELL

BACKGROUND OF THE INVENTION

1. Field of the Invention

This invention relates to the gravel packing of oil wells, gas wells, and similar boreholes and is particularly concerned with an improved method of gravel packing.

2. Description of the Prior Art

Many hydrocarbon reservoirs are poorly consolidated and therefore production of these reservoirs often requires the application of sand control techniques. Gravel packing is widely used for controlling the production of sand from oil wells, gas wells, and similar boreholes. This normally involves the injection of a fluid suspension of sand, gravel, or similar particles into the well to form a permeable bed of solids adjacent the formation. Any formation fines carried by the produced fluids are trapped and deposited at the periphery of the gravel pack, permitting clean fluids to be produced.

The most common type of gravel packed completion involves placing a screen or slotted liner in the wellbore adjacent the incompetent formation and introducing a fluid suspension of the gravel packing material into the wellbore so that the bed of gravel is formed around the screen or liner. The use of screens or liners is generally accompanied by certain undersirable features, including a steady decline in the productivity of the well as the screen is gradually plugged. Such devices frequently have a relatively short life span and their removal complicates workovers. The formation of a single channel through the gravel as a result of shifting and settling may be sufficient to cause screen plugging and failure, requiring a costly and time-consuming workover to resume production.

Another type of gravel pack is the consolidated gravel pack. This technique involves introducing into the wellbore around the screen or liner a solution containing a plastic consolidating agent in addition to the gravel packing material. Once the gravel bed has cured, a high permeability, consolidated pack is formed which mechanically restrains formation sand. This technique is not widely used since any plugging of the screen or liner results in an extremely difficult work-over operation.

These difficulties have led to a third broad type of gravel pack wherein a consolidated gravel pack is formed in the wellbore annulus (and typically in an annular cavity outside casing as well) adjacent the formation without the use of a screen or liner. Once fully consolidated, the consolidated gravel bed inside the casing is either fully or partially drilled out. An example of this technique is described in U.S. Pat. No. 3,867,986. However, this technique can present difficulties since drilling can cause cracks to form in the gravel pack; also, drilling tends to form solids which can plug the consolidated gravel pack. In addition, the heat generated by drilling can damage the inner cylindrical wall of the plastic consolidated gravel pack, resulting in reduced rates of production.

SUMMARY OF THE INVENTION

This invention provides an improved gravel packing technique which alleviates the difficulties referred to above. Briefly, the method involves placing an elongate member such as a rod or pipe in the wellbore adjacent the incompetent formation, introducing into the wellbore gravel packing material suspended in a suitable fluid and a resinous consolidating reagent such that a gravel bed is formed around the rod or pipe, followed by removal of the rod or pipe once the gravel bed has cured. A high permeability, high strength, self-supporting, annular gravel sheath having no liner or screen is formed. An advantage of this method is that once the gravel sheath has cured, no metal remains downhole adjacent the formation to impede future repair operations. Further, the problems associated with drilling the consolidated gravel pack are avoided.

The gravel packing material used in the invention comprises coarse particles of sand, gravel, glass beads, or the like. In a preferred embodiment, the particles have been coated with a fusible, thermosetting resin. The resulting resin-coated particles, when cured in-situ, form a permeable, self-sustaining structure.

The rod or pipe around which the gravel sheath is initially formed may be coated with a fluorocarbon polymer to facilitate removal after the gravel bed cures. In a preferred embodiment, a slightly tapered pipe is utilized which can be compression loaded to mechanically load the gravel bed while curing to improve the final strength of the resulting gravel pack. In addition, use of a tapered pipe eases removal.

DESCRIPTION OF THE PREFERRED EMBODIMENTS

Figure 1:
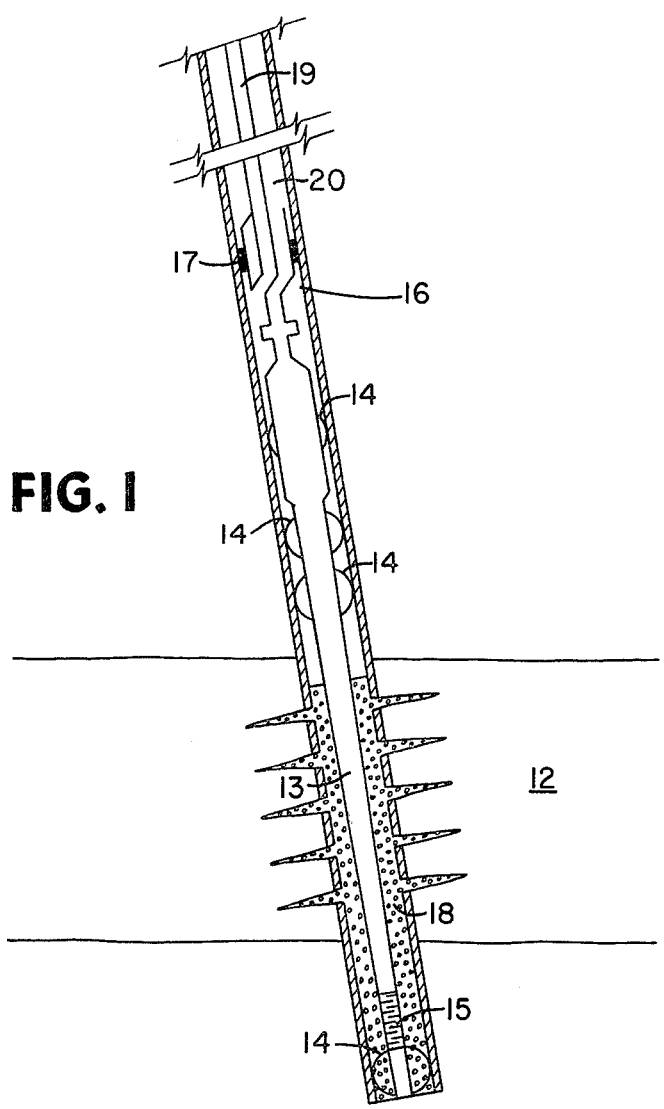
FIG. 1 is a partial, schematic diagram of apparatus used in practicing the present invention in a well penetrating an unconsolidated formation.

In most instances, particulate material used to form the gravel pack according to the method of the present invention will be sand. However, it will be readily apparent to those skilled in the art that other particulate material may be used, i.e. glass beads or well rounded pellets of iron, steel, ceramic, and the like. The particle size of the gravel will be selected in relation to the size of formation particles. The sizing may be by conventional techniques based upon sieve analysis data.

A variety of different resinous consolidating reagents which will adhere to the particles selected and/or which are inert to crude oil, natural gas, water, brine and other fluids normally found in subterranean formations after curing may be used for bonding the particulate material of the gravel pack. Preferred reagents are generally synthetic resins such as epoxy resins, phenol-formaldehyde resins, furfuryl alcohol resins, and the like. However, many commercially available resinous consolidating reagents used in consolidating incompetent formations can be employed for purposes of the invention and will readily suggest themselves to those skilled in the art. Silane coupling agents can be used with the consolidating reagent to improve the bond between the gravel and the plastic.

A preferred composition for performing the method of the present invention comprises particulate material coated with a solid, fusible, thermosetting resin. When this preferred material is used in forming a gravel pack, at formation conditions, the resin first melts and then cures to an insoluble, infusible state. A permeable, self-sustaining structure adjacent the formation is formed.

The resinous material used in preparing the preferred composition is a one-step, alkaline-catalyzed, phenolic resin, or an A-stage phenolic resin. The distinguishing characteristic of the one-step resin is that the resin is soluble in certain solvents, fusible and curable by the application of heat alone, and requires no additional catalyst or curing agent. The one-step phenolic resins are prepared by reacting phenol with aldehydes in the presence of alkaline catalysts such as inorganic hydroxides, quaternary ammonium hydroxide or tertiary amines. In addition to phenol, resorcinol, alkyl substitued phenols such as cresol, and p-tert.-butylphenol, p-phenol phenol, and Cardanol may also be used. The aldehyde is normally formaldehyde, but acetaldehyde and furfuraldehyde are also used. The one-step phenolic resins may be prepared by reacting phenol and formaldehyde in a mole ratio of between about 1:1 and about 1:1.5 at a pH above about 7. As the materials react, the average molecular weight of the resin increases. By cooling, the rate of reaction may be slowed and stopped to form a solid, partially polymerized resin which is soluble in organic solvents and is fusible. This solid, one-step, thermosetting resin is commercially available in powder form.

The fusible resin is then applied as a coating to a particulate substrate by dissolving powdered resin in a suitable solvent, mixing the resulting solution with the particles, and finally evaporating the solvent. The final product is a preferred composite material consisting of a substrate and an encapsulating coating of a solid resin. This preferred composition is characterized as free-flowing and can be stored for relatively long periods of time at surface temperatures without appreciable agglomeration. A hot coating process may also be used. This technique involves preheating the substrate to several hundred degrees Fahrenheit, slowly adding a fusible resin to the substrate, mixing the substrate and the resin until the resin melts and completely coats the individual particles, and finally cooling the coated particles to return the resin to the solid state. However, it is preferred that the coated material be prepared by the solvent process. Further information regarding the use of this material is provided in U.S. Pat. No. 3,929,191.

Regardless of the coating process, it is preferred that the system include an organosilicon compound to improve the bond between the substrate and resin. For phenolic resins, the preferred coupling agent is an organofunctional silane such as aminoalkylsilane. A silane that has given excellent results with phenolic resins is gamma-aminopropyltriethyoxy silane. For epoxy resins, suitable coupling agents include epoxyalkylsilane esters such as beta-(3,4-epoxycyclohexyl) ethyltrimethoxysilane. The effects of coupling agents with resins are well known in the art and are described at length in the literature. The most effective coupling agent for a particular system may be selected on the basis of published literature.

In lieu of one-step phenolics, the invention may employ other resin materials such as two-step phenolic resins or epoxy resins. For example, an epoxy resin including a latent, modified polyamide may be used to coat the particulate substrate. At surface conditions, the coated particles may be stored for relatively long periods of time; however, at reservoir conditions, the polymerization reaction is accelerated causing the particles to become bonded together. In lieu of coating the particulate material, resin material can be introduced after depositing gravel in the wellbore to consolidate the gravel pack. The in situ cure step may be controlled by the addition, via carrier fluids, of curing agents, retarding agents, accelerators, or catalysts. Also thermal techniques such as application of heat may be used to control in situ reactions.

Usful epoxy resins include the diglycidyl ethers of bisphenol-A [bis-(4-hydroxyphenol) dimethylmethane] obtained by the reaction between epichlorohydrin (1-chloro-2,3-epoxypropane) and bisphenol-A in the presence of an alkali such as sodium hydroxide or potassium hydroxide. Similar resins can be prepared by reacting a mono-nuclear di- or trihydroxy phenol such as resorcinol, hydroquinone, pyrocatechol, or chloroglucinol or a polynuclear polyhydroxyphenol such as 4,4-dihydroxybiphenyl with a halohydrin such as 1,2-dichloro-3-hydroxypropane or dichlorohydrin. Still other satisfactory materials include the commercial epoxy resins prepared by the condensation of novolac resins with epichlorohydrin.

The epoxy resins are employed in conjunction with curing agents or catalysts such as diethylenetriamine, ethylenediamine, dimethylaminopropylamine, diethylaminopropylamine, piperidine, menthane diamine, triethylamine, benzyldiethylene diethylamino phenol, trimethylaminomethyl phenol, α-methylenedianiline, and mixtures of such amines. Acidic catalysts such as oxalic acid, phthalic acid, pyromellitic acid, pyromellitic dianhydride, and dodecenyl succinic anhydride can also be used.

The method of the present invention will be described in detail with respect to a cased hole or inside gravel pack, which involves the placement of the gravel inside casing adjacent perforations. However, it should be recognized that the method is not limited to this particular gravel pack, and may be used with other types, including the open hole gravel pack.

With reference to FIG. 1, the method involves lowering into casing string 11, a tubing string 19 which includes a shaping pipe 13 around which gravel will be deposited, together with other conventional gravel packing equipment, including centralizers 14, fluid return section 15, crossover tool 16, and packer 17. A gravel slurry containing plastic consolidating reagents is then introduced into the casing string 11 and the gravel is compacted around the shaping pipe 13.

Preferably, the gravel slurry comprises a suitable carrier fluid in which is suspended the particulate material which has been coated with the fusible thermosetting resin. The preferred aggregate material is sized to screen out or cause the formation sand entrained in fluid to bridge. The particle size of the aggregate is selected in relation to the size of the formation particles by conventional techniques well-known in the art. Generally, the aggregate size will range between about 6 and about 120 mesh, with the most common size ranging between about 10 and about 60 mesh.

Once the shaping pipe 13 is properly located the packer 17 is set and the pumping operations are commenced. The resin-coated particles suspended in a suitable carrier fluid are pumped through the tubing string 19, through crossover tool 16, and around the outside of shaping pipe 13. The carrier fluid enters shaping pipe 13 via fluid return section 15 and returns to the surface via crossover tool 16 and the casing-tubing annulus 20. Crossover tools suitable for practicing this invention are well-known to those skilled in the art and need not be described further herein. Fluid return section 15 is a short section of slotted pipe, a screen, or the like, and serves to provide a return path for the carrier fluid.

The particles deposited in the well form a filter bed in the borehole surrounding shaping pipe 13. When the complete interval is packed in this manner, the wellbore is shut in to allow the resin to cure. As the temperature of the packed interval increases due to formation heat the resin melts or softens, bonds together, and hardens to an infusible, crosslinked state. Additionally, fluids heated to reservoir temperature may be circulated downhole in order to accelerate the hardening process. This produces a permeable, self-sustaining structure surrounding shaping pipe 13.

Figure 2:
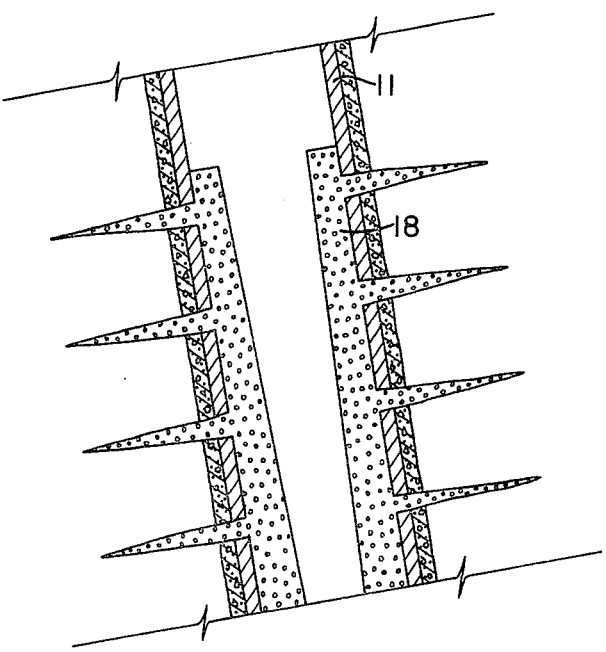
FIG. 2 is a partial, schematic diagram of a gravel pack obtained using the method of the present invention.

Once the bed of gravel has cured, the shaping pipe 13, together with the other gravel packing equipment adjacent the formation, is removed from the well. As shown in FIG. 2, an inside casing, consolidated annular gravel sheath 18 of high permeability and strength is formed having no screen or liner downhole adjacent the formation which would later impede repair operations.

Generally, the specific procedures and apparatus used in placing the gravel around the shaping pipe 13 will depend on the requirements of a particular wellbore. For example, in the case of a long interval (approximately 100 feet or more) and a deviated hole as shown in FIG. 1, the procedure may include the use of apparatus having a shear assembly located above the short fluid return section 15 (approximately 2 feet in length). The normal sand screen or liner disposed opposite the perforations is replaced by the shaping pipe 13. Preferably, the shaping pipe 13 is tapered and coated with fluorocarbon polymer to facilitate removal. The gravel slurry containing plastic consolidating reagents is then placed as described previously.

Once the gravel pack has cured, the shaping pipe is lifted from the gravel, shearing the shear assembly to leave the lower section 15 in the wellbore. While this requires some metal to be left in the wellbore, the amount is relatively small and located well below the perforations. A production packer is then set above the gravel leaving no metal screen or liner opposite the perforations. Further details concerning apparatus useful in practicing the method of the present invention may be found in Baker Technical Bulletin TB-664-R. Other means could also be provided for detaching section 15 from the shaping pipe 13, e.g. a C or J latch; such devices are well-known in the art.

As mentioned previously, the shaping pipe 13 is preferably tapered to facilitate removal, as illustrated in FIG. 1. Further, the tapered shaping pipe 13 can be compression loaded to mechanically load the gravel during cure in order to improve the compressive strength of the resulting gravel pack 18.

As previously indicated, an epoxy resin material and curing agent can be used to consolidate the gravel bed. The procedure is substantially the same as previously described for the preferred composition, except that after a gravel bed of particulate material has been formed around shaping pipe 13, an epoxy resin solution is injected into the bed followed by catalyst or curing agent. Thus, a two-stage operation is employed in which the epoxy resin is first dissolved in a suitable solvent such as a mixture of ethyl alcohol, acetone or ethyl ketone with kerosene, diesel oil or white oil containing added aromatics and injected into the gravel bed, and a kerosene or similar oil that is substantially free of aromatics and contains a catalyst or curing agent is threafter injected. The latter solution displaces the resin solution from the pore spaces of the gravel bed. Catalyst or curing agent contained in the second solution is extracted by the resin solution that remains in contact with the grains of particulate material. In the presence of the extracted catalyst or curing agent the resin hardens and bonds the individual grains of particulate material together to form the consolidated gravel sheath 18. The use of epoxy resins for sand consolidation by two-stage processes and by single-stage processes, as where catalyst is mixed with the resin solution at the surface, has been described in detail in the prior art.

It should be noted that still other resin materials well known in the art may be used in the method of the present invention, utilizing single and multiple stage processes in curing the resin as well as coated and noncoated particulate materials. For example, precatalyzed epoxy resins, furfuryl alcohol resins and the urea formaldehyde resins can be employed. Further details concerning these resin materials are readily available in the literature.

The principle of the invention and the best mode in which it is contemplated to apply have been described. It is to be understood that the foregoing is illustrative only and that other means, techniques, and materials can be employed without departing from the true scope of the invention defined in the following claims.

We claim:

1. A method of gravel packing a well penetrating a subterranean formation which comprises placing a pipe in said well, surrounding said pipe with a particulate material, consolidating said particulate material to form a self-sustaining, permeable consolidated sheath around said pipe, and thereafter removing said pipe.

2. The method of claim 1 wherein said particulate matter is coated with a fusible, thermosetting resin.

3. The method of claim 2 wherein the thermosetting resin cures by formation heat to consolidate said particulate material.

4. The method of claim 3 wherein said thermosetting resin is a one-step, alkaline catalyzed, phenolic resin.

5. The method of claim 1 wherein said particulate material is coated with an epoxy resin.

6. The method of claim 5 wherein said epoxy resin cures by formation heat to consolidate said particulate material.

7. The method of claim 1 which includes the use of an epoxy resin in the consolidation step.

8. The method of claim 7 wherein a catalyst is used to cause said epoxy resin to cure.

9. A method of forming a consolidated gravel pack in a well which comprises disposing a pipe within the well, depositing gravel around the pipe to form a gravel bed, consolidating the gravel bed, and withdrawing the pipe to leave a self-supporting, annular gravel sheath inside the wellbore.

10. A method of completing a well surrounded by a hydrocarbon producing subterranean formation, which comprises:
 (a) placing a pipe in said well,
 (b) packing particles coated with a solid, fusible, thermosetting resin around said pipe,
 (c) permitting said resin to cure to an infusible state thereby bonding said particles together, and
 (d) thereafter removing said pipe.

11. A method as defined in claim 10 wherein said resin is an A-stage phenolic resin.

12. A method of gravel packing a well extending into a hydrocarbon-bearing formation which comprises:
  (a) extending an elongate member into said well around which a bed of particulate material can be formed adjacent to said formation;
  (b) surrounding said member with a bed of particulate material;
  (c) consolidating said particulate material to form a high strength, high permeability, self-supporting consolidated sheath around said member; and
  (d) withdrawing said member such that no metal objects that can impede future well repair operations remain within said well adjacent to said formation.

13. A method of forming a consolidated gravel pack in a well which comprises disposing a pipe within the well, coating said pipe with a fluorocarbon polymer, depositing gravel around the pipe to form a gravel bed, consolidating the gravel bed, and withdrawing the pipe to leave a self-supporting, annular gravel sheath inside the wellbore.

14. A method of forming a consolidated gravel pack in a well which comprises disposing a tapered pipe within the well, depositing gravel around the pipe to form a gravel bed, consolidating the gravel bed, and withdrawing the pipe to leave a self-supporting, annular gravel sheath inside the wellbore.

15. A method of forming a consolidated gravel pack in a well which comprises disposing a pipe within the well, depositing gravel around the pipe to form a gravel bed, consolidating the gravel bed, applying a compressive force to said gravel bed during the consolidation step so that the compressive strength of said gravel pack is increased, and withdrawing the pipe to leave a self-supporting, annular gravel sheath inside the wellbore.

* * * * *